US012785001B2

(12) United States Patent
Gu et al.

(10) Patent No.: US 12,785,001 B2
(45) Date of Patent: Nov. 3, 2026

(54) MECHANICAL BREAKPOINT MODULE AND SOLID-STATE CIRCUIT BREAKER

(71) Applicant: Schneider Electric (China) Co., Ltd., Beijing (CN)

(72) Inventors: Lin Gu, Shanghai (CN); Zhigang Han, Shanghai (CN)

(73) Assignee: Schneider Electric (China) Co., Ltd., Beijing (CN)

( * ) Notice: Subject to any disclaimer, the term of this patent is extended or adjusted under 35 U.S.C. 154(b) by 118 days.

(21) Appl. No.: 18/541,104

(22) Filed: Dec. 15, 2023

(65) Prior Publication Data

US 2025/0182980 A1 Jun. 5, 2025

(30) Foreign Application Priority Data

Dec. 1, 2023 (CN) ......................... 202311635887.7

(51) Int. Cl.
*H01H 9/20* (2006.01)
*H01H 71/12* (2006.01)

(52) U.S. Cl.
CPC ............ *H01H 9/20* (2013.01); *H01H 71/123* (2013.01)

(58) Field of Classification Search
CPC ........ H01H 9/20; H01H 71/123; H01H 71/52; H01H 3/38; H01H 5/06; H01H 71/121; H01H 9/548; H01H 71/12
See application file for complete search history.

(56) References Cited

U.S. PATENT DOCUMENTS

| | | | | |
|---|---|---|---|---|
| 8,476,992 B2 * | 7/2013 | Yang | .................... | H01H 71/505 335/167 |
| 8,836,453 B2 * | 9/2014 | Yang | ........................ | H01H 9/20 335/167 |
| 2020/0365346 A1 | 11/2020 | Telefus et al. | | |
| 2021/0126447 A1 | 4/2021 | Miller et al. | | |
| 2022/0337046 A1 | 10/2022 | Erven | | |

FOREIGN PATENT DOCUMENTS

CN 219163311 U 6/2023

OTHER PUBLICATIONS

European Search Report and Search Opinion dated May 28, 2024 for corresponding European Patent Application No. EP 23216455.8, 13 pages.

* cited by examiner

*Primary Examiner* — Lheiren Mae A Caroc
(74) *Attorney, Agent, or Firm* — Kinney & Lange, P.A.

(57) ABSTRACT

A mechanical breakpoint module, which is used for a solid-state circuit breaker and includes a housing; a handle; a fixed contact; a moving contact; a transmission assembly through which the movement of the handle is transmitted to the moving contact; an energy storage component connected to the transmission assembly and configured to drive the transmission assembly to move; a locking assembly capable of being switched between a locked state and an unlocked state; wherein the locking assembly can receive an unlocking signal sent by the controller to be switched from the locked state to the unlocked state, so that the transmission assembly is driven by the energy storage component, and then the moving contact is driven to be separated from the fixed contact.

7 Claims, 4 Drawing Sheets

MECHANICAL BREAKPOINT MODULE AND SOLID-STATE CIRCUIT BREAKER

TECHNICAL FIELD

The present invention relates to a mechanical breakpoint module for a solid-state circuit breaker and a solid-state circuit breaker, and more specifically to a mechanical breakpoint module with a free tripping function and a solid-state circuit breaker including the mechanical breakpoint module.

BACKGROUND

During the operation of the mechanical breakpoint module for a solid-state circuit breaker, the movement of the handle drives the movement of the moving contact, so as to control the contact or separation between the moving contact and the fixed contact (corresponding respectively to the closed state and the open state of the mechanical breakpoint module), thereby realizing the control of closing and opening of the circuit. The solid-state circuit breaker includes a mechanical breakpoint module and an electronic breakpoint module connected in series, and the electronic breakpoint module can be switched open by the controller sending a control signal. However, in the existing solid-state circuit breakers, the mechanical breakpoint module does not have the function of free tripping. When the operation handle of the mechanical breakpoint module is locked in the closed position, the controller can only control the electronic breakpoint module to be switched open, but not the mechanical breakpoint module, and the mechanical breakpoint module can only be switched open manually. In this way, once the electronic breakpoint module fails, the solid-state circuit breaker cannot be switched open automatically, and the mechanical breakpoint module can only be switched open manually. If an unexpected event such as an overload occurs in the circuit, it is difficult to switch open the solid-state circuit breaker automatically, which adversely affects the stability and safety of the circuit.

Therefore, it is desirable to propose a mechanical breakpoint module for a solid-state circuit breaker and a solid-state circuit breaker including the mechanical breakpoint module, so as to resolve the above-mentioned defects in the prior art.

SUMMARY

According to a first aspect of the present invention, a mechanical breakpoint module is provided, which is used for a solid-state circuit breaker and includes a housing; a handle mounted to the housing and rotatable between an open position and a closed position; a fixed contact fixed to the housing; a moving contact capable of rotating so as to contact or separate from the fixed contact so that the mechanical breakpoint module is in a closed state and a open state respectively; a transmission assembly, through which the movement of the handle is transmitted to the moving contact; an energy storage component connected to the transmission assembly and configured to drive the transmission assembly to move; a locking assembly able to be switched between a locked state and an unlocked state, wherein when the locking assembly is in the locked state, the mechanical breakpoint module cannot be switched from the closed state to the open state, and when the locking assembly is in the unlocked state, the mechanical breakpoint module can be switched from the closed state to the open state; wherein the locking assembly can receive a unlocking signal sent by a controller to be switched from the locked state to the unlocked state, so that the transmission assembly is driven by the energy storage component and in turn drives the moving contact to be separated from the fixed contact.

According to this solution, when the mechanical breakpoint module is in the closed state, if an unexpected event such as an overload occur in the circuit, the controller can send an unlocking signal to switch the locking assembly to the unlocked state, and then the energy released by the energy storage component can separate the moving contact from the fixed contact, so that the mechanical breakpoint module can be switched from the closed state to the open state, which opens the circuit and protects the circuit. The above process does not require manual operation, which improves the safety and stability of the circuit.

In some solutions, the transmission assembly includes a first connecting rod, a second connecting rod and a transmission component, and the handle is connected to the first end of the first connecting rod via the energy storage component; the first end of the first connecting rod is rotatably connected with the first end of the second connecting rod, and the second end of the first connecting rod opposite to the first end is rotatably mounted to the housing; the second end of the second connecting rod opposite to the first end is rotatably connected with the transmission component; the transmission component is rotatably mounted to the housing, and the connection point between the transmission component and the second connecting rod is spaced apart from the mounting point between the transmission component and the housing; the transmission component is fixedly connected with the moving contact, and when the locking assembly is in the locked state, the locking assembly can block the movement of the transmission component, thereby preventing the mechanical breakpoint module from being switched from the closed state to the open state.

In some solutions, the transmission component may include a main body and a first protruding part, a second protruding part and a third protruding part protruding outward from the main body. The mounting point between the transmission component and the housing is located on the first protruding part, the second protruding part is fixedly connected with the moving contact, and the third protruding part abuts the locking assembly.

In some solutions, the locking assembly can include an opening lever with a protrusion and a lock catch with a lock hole. When the locking assembly is in the locked state, the protrusion is inserted into the lock hole, so that the opening lever is fixed relative to the lock catch, so that the lock catch can block the movement of the transmission component, thereby preventing the mechanical breakpoint module from being switched from the closed state to the open state.

In some solutions, the energy storage component may be a spring.

According to this solution, when the locking assembly is unlocked, the spring can release its stored elastic potential energy to drive the transmission assembly to move, thereby driving the moving contact to move in a direction away from the fixed contact. In this way, when the locking assembly is unlocked, the mechanical breakpoint module can be switched open automatically under the action of the spring and without manual operation, which further improves the reliability and safety of the circuit.

In some solutions, the handle can include a driving arm, and when the locking assembly is in the locked state, when the handle is rotated to the open position, the driving arm can contact the opening lever and drive the opening lever to rotate, so that the locking assembly moves to the unlocked state.

According to this solution, when the locking assembly is in the locked state, the mechanical breakpoint module can be switched open only by operating the handle. Specifically, firstly, the locking assembly is unlocked by the driving arm on the handle, then the transmission assembly is driven by the elastic force of the spring to further drive the moving contact to move, so as to realize the separation of the moving contact from the fixed contact, thereby switching open the mechanical breakpoint module.

In some solutions, the mechanical breakpoint module can also include a button, one end of which protrudes out of the housing, and the other end of which is close to the opening lever. When the locking assembly is in the locked state, when the button is pressed, the button can contact the opening lever and drive the opening lever to rotate, so that the locking assembly moves to the unlocked state.

According to this solution, when the locking assembly is in the locked state, the mechanical breakpoint module can be switched open by pressing the button. Specifically, firstly, the locking assembly is unlocked by pressing the button, then the transmission assembly is driven by the elastic force of the spring to further drive the moving contact to move, so as to realize the separation of the moving contact from the fixed contact, thereby switching open the mechanical breakpoint module.

In some solutions, the transmission component may be a bird's head.

According to a second aspect of the present invention, a solid-state circuit breaker is provided, which includes the mechanical breakpoint module according to the first aspect of the present invention.

According to this solution, when the mechanical breakpoint module is in the closed state, if an unexpected event such as an overload occur in the circuit, the locking assembly can be switched to the unlocked state, and then the moving contact can be separated from the fixed contact by the elastic force of the spring, so that the mechanical breakpoint module can be switched from the closed state to the open state, and the solid-state circuit breaker can be switched to the open state, and the circuit is protected.

In some solutions, the solid-state circuit breaker can also include an electronic breakpoint module, which is connected in series with the mechanical breakpoint module.

According to this solution, any one of the electronic breakpoint module and the mechanical breakpoint module being switched open can lead to the solid-state circuit breaker being switched open. When an unexpected event such as an overload occur, even if one of the electronic breakpoint module and the mechanical breakpoint module fails and is not switched open in time, the circuit can still be cut off by switching open the other one of the electronic breakpoint module and the mechanical breakpoint module, thus protecting the circuit. In this way, the reliability and safety of the circuit are further improved.

Figure 1:
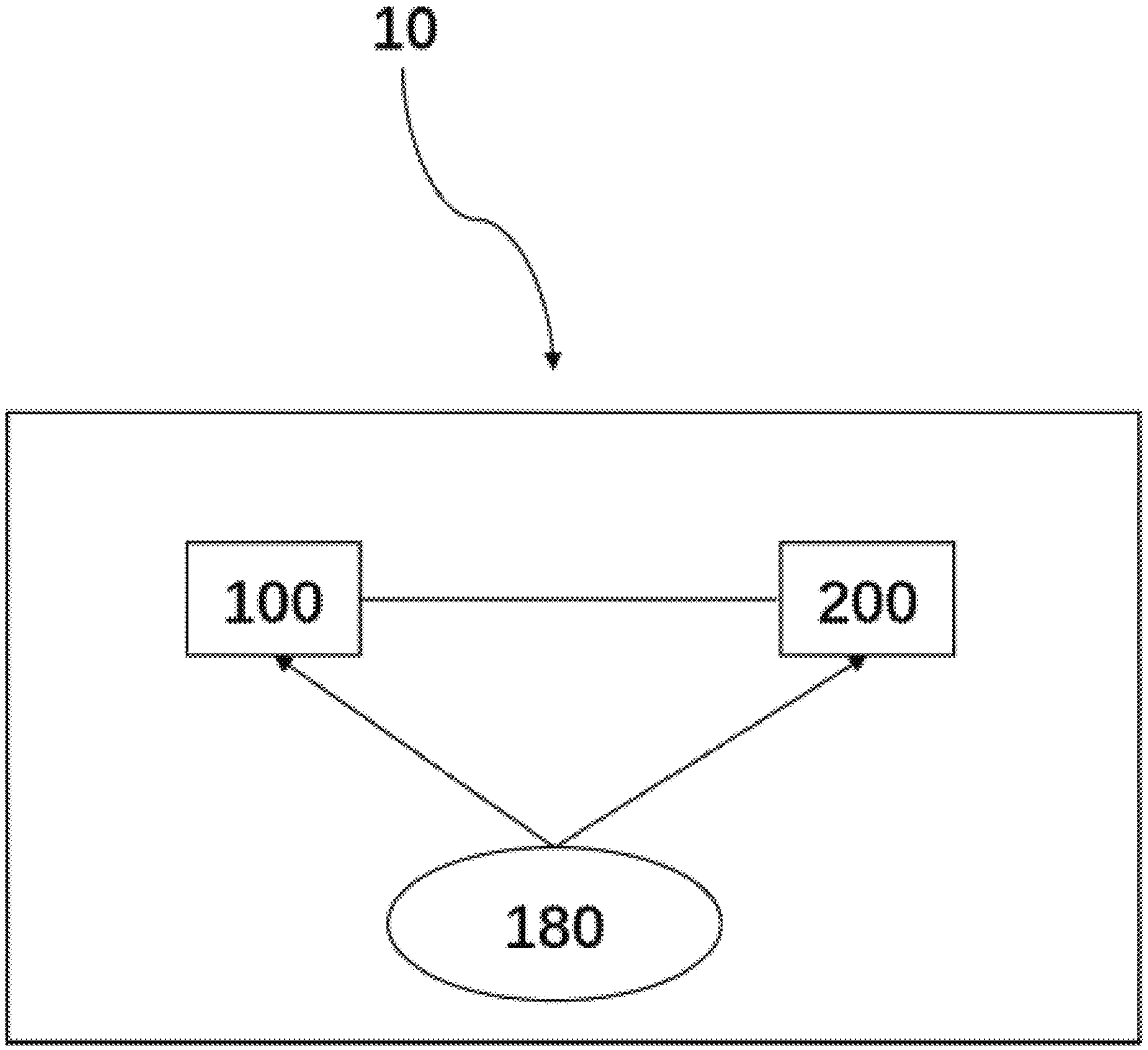
FIG. 1 shows a schematic diagram of a solid-state circuit breaker according to an embodiment of the present invention.

Reference numerals: 10 solid-state circuit breaker, 100 mechanical breakpoint module, 110 housing, 120 fixed contact, 130 moving contact, 140 handle, 142 driving arm, 150 transmission assembly, 152 first connecting rod, 154 second connecting rod, 156 transmission component, 156-1 first protruding part, 156-2 second protruding part, 156-2 second protruding part, 156-3 third protruding part, 160 locking assembly, 162 opening lever, 164 protrusion, 166 lock catch, 170 spring, 180 controller, 200 electronic breakpoint module.

DETAILED DESCRIPTION OF THE EMBODIMENTS

In order to make the purpose, solutions and advantages of the technical solutions of the present invention clearer, the technical solutions of the embodiments of the present invention will be described clearly and completely with the attached drawings of the specific embodiments of the present invention. Unless otherwise specified, the terms used herein have the ordinary meaning in the art. In the drawings, the same reference numerals represent the same parts.

As shown in FIG. 1, the mechanical breakpoint module 100 of the present invention is used in a solid-state circuit breaker 10, and the solid-state circuit breaker 10 further includes an electronic breakpoint module 200 and a controller 180. The mechanical breakpoint module 100 and the electronic breakpoint module 200 are connected in series, and the controller 180 is communicatively coupled to the electronic breakpoint module 200. In the prior art, when an unexpected event occurs in the circuit and the circuit needs to be switched open to be protected, the controller 180 sends signals to the electronic breakpoint module 200 and the mechanical breakpoint module 100 to switch open the electronic breakpoint module 200 and the mechanical breakpoint module 100, thereby switching open the solid-state circuit breaker 10. Because the mechanical breakpoint module 100 does not have the function of free tripping, when the operation handle of the mechanical breakpoint module 100 is locked, the mechanical breakpoint module 100 cannot be switched open automatically. When the electronic breakpoint module 200 fails and cannot be switched open in time, the solid-state circuit breaker 10 can only be switched open by manually operating the mechanical breakpoint module 100 and switching the mechanical breakpoint module 100 open. However, when the electronic breakpoint module 200 fails and cannot be switched open in time, and if the mechanical breakpoint module 100 cannot be manually operated in time, the solid-state circuit breaker 10 may not be switched in time to protect the circuit. Therefore, in the embodiments of the present invention, the controller 180 is communicatively coupled to the electronic breakpoint module 200 and the mechanical breakpoint module 100, and the mechanical breakpoint module has a free tripping function, and the controller 180 can send a signal to the mechanical breakpoint module 100, so that the mechanical breakpoint module 100 can be switched open automatically, thereby switching open the solid-state circuit breaker 10. The above functions will be described in detail below.

Figure 2:
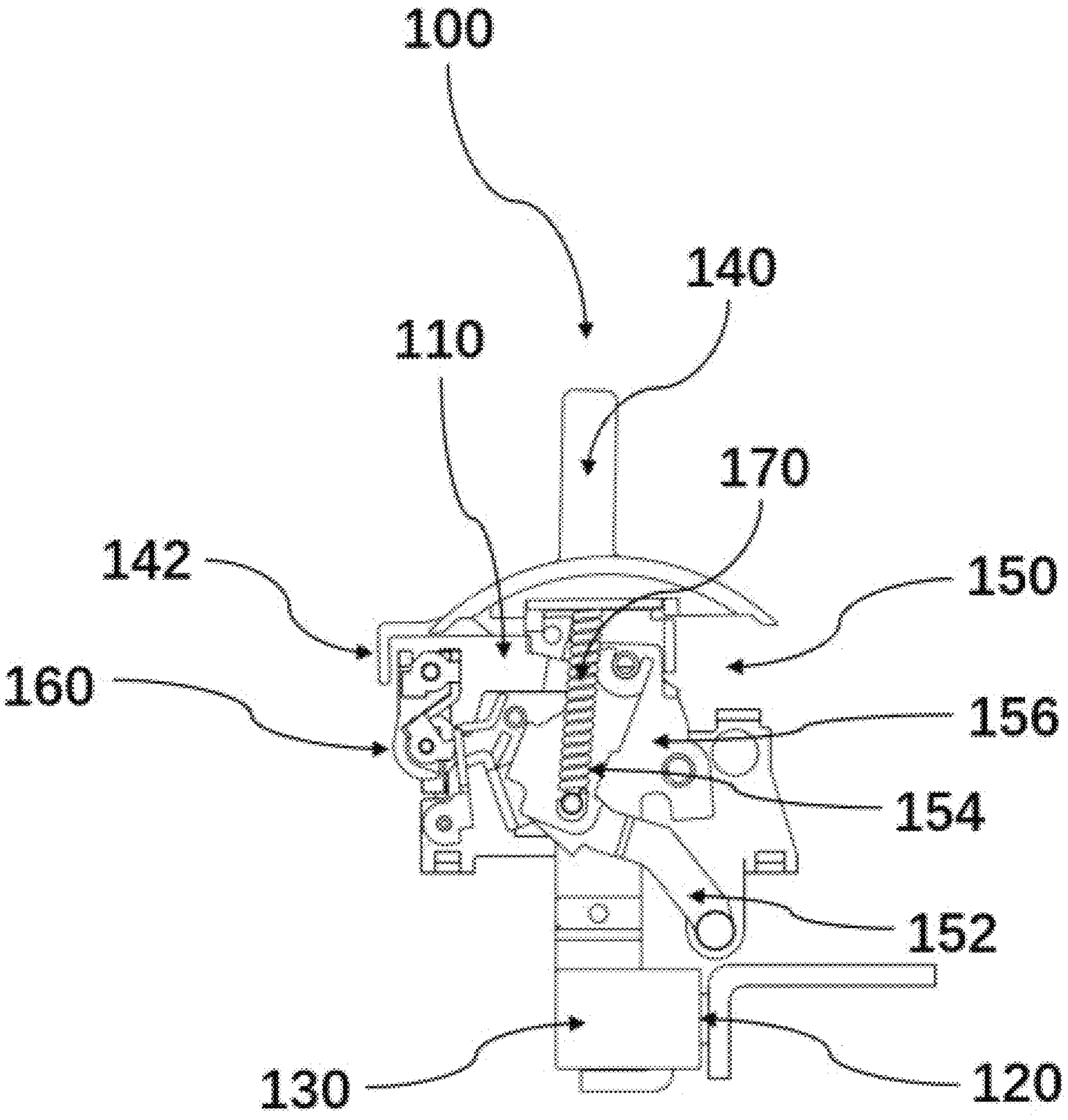
FIG. 2 shows a schematic diagram of a mechanical breakpoint module in the closed state according to an embodiment of the invention.
Figure 3:
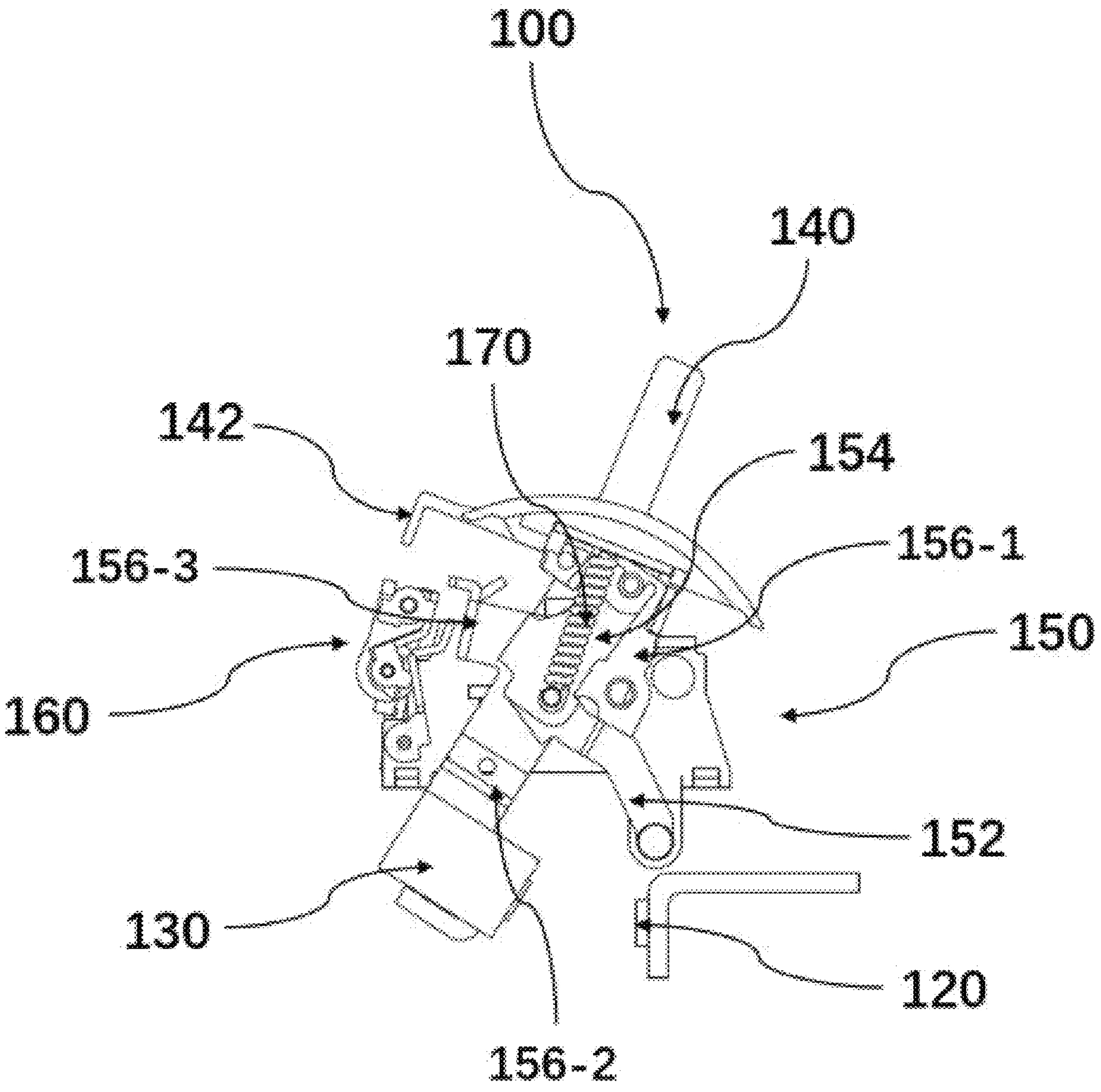
FIG. 3 shows a schematic diagram of a mechanical breakpoint module in the open state according to an embodiment of the present invention.
Figure 4:
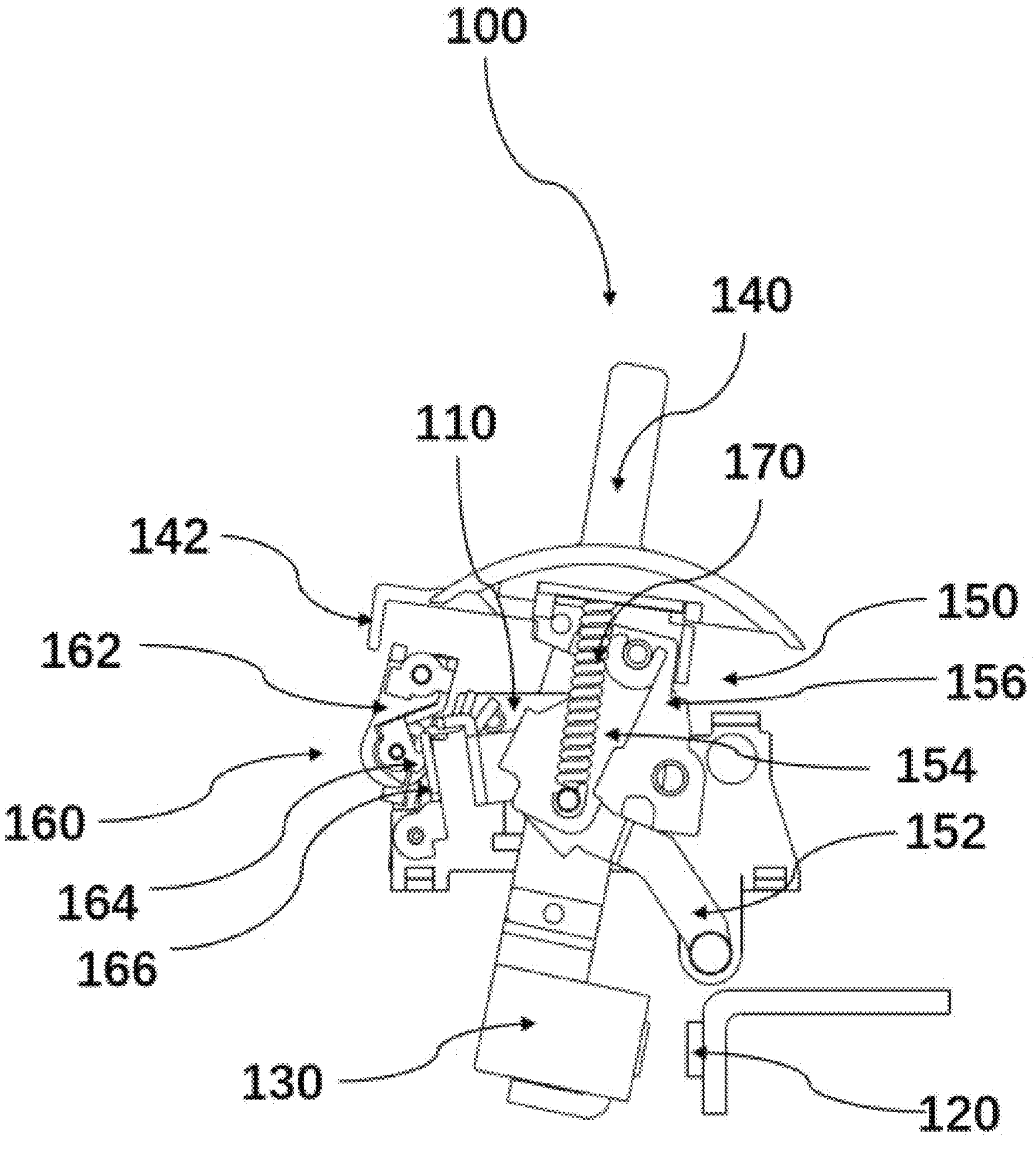
FIG. 4 shows a schematic diagram of a mechanical breakpoint module in an intermediate state according to an embodiment of the present invention.

FIGS. 2 and 3 show schematic diagrams of the mechanical breakpoint module 100 in the closed state and the open state respectively according to an embodiment of the present invention. The mechanical breakpoint module 100 mainly includes a housing 110, a fixed contact 120 fixed to the housing 110, a moving contact 130 capable of moving relative to the fixed contact 110, a handle 140, a transmission assembly 150, an energy storage component 170 connected to the transmission assembly 150 and configured to drive the transmission assembly 150 to move, and a locking assembly 160. The transmission assembly 150 can transmit the movement of the handle 140 to the moving contact 130, so that the handle 140 can be manually operated to move the moving contact 130. When the moving contact 130 contacts the fixed contact 120, the mechanical breakpoint module 100 is in the closed state, and when the moving contact 130 is separated from the fixed contact 120, the mechanical breakpoint module 100 is in the open state. The locking assembly 160 can control the degree of freedom of the transmission assembly 150. When the locking assembly 160 is in the locked state, the degree of freedom of the transmission assembly 150 is frozen (that is, the transmission assembly 150 cannot move), so that the moving contact 130 driven by the transmission assembly 150 cannot move away from the fixed contact 120, so that the mechanical breakpoint module 100 is maintained in the closed state. When the locking assembly 160 is in the unlocked state, the degree of freedom of the transmission assembly 150 is released (that is, the transmission assembly 150 can move), so that the moving contact 130 driven by the transmission assembly 150 can move away from the fixed contact 120, so that the mechanical breakpoint module 100 can be switched from the closed state to the open state.

The controller 180 is communicatively coupled with the locking assembly 160 (for example, by wired means or wireless means (such as Wi-Fi, NFC, RFID, etc.)), and when the locking assembly 160 is in a locked state, the controller 180 can send an unlocking signal to the locking assembly 160 so that the locking assembly 160 moves to an unlocked position. In this way, when the locking assembly 160 is in the locked state, the mechanical breakpoint module 100 can be switched open by the controller 180 sending a signal. Specifically, firstly, the controller 180 sends a signal so that the locking assembly 160 is unlocked, and then the energy released by the energy storage component 170 drives the transmission assembly 150 to move, which further drives the moving contact 130 to move so as to realize the separation of the moving contact 130 from the fixed contact 120, thereby switching open the mechanical breakpoint module 100.

Preferably, the specific transmission mechanism for the transmission assembly 150 is as the following detailed description. The transmission assembly 150 includes a first connecting rod 152, a second connecting rod 154 and a transmission component 156. The handle 140 is connected to the first end of the first connecting rod 152 via a spring 170. The first end of the first connecting rod 152 is rotatably connected with the first end of the second connecting rod 154, and the second end of the first connecting rod 152 opposite to the first end is rotatably mounted to the housing 110. The second end of the second connecting rod 154 opposite to the first end is rotatably connected with the transmission component 156. The transmission component 156 is rotatably mounted to the housing 110, and the connection point between the transmission component 156 and the second connecting rod 154 is spaced apart from the mounting point between the transmission component 156 and the housing 110. The transmission component 156 is fixedly connected with the moving contact 130. To sum up, the first connecting rod 152, the second connecting rod 154 and the transmission component 156 form a four-link transmission mechanism. The rotation of the handle 140 drives, through the spring 170, the first connecting rod 152 to rotate, and the first connecting rod 152 drives the second connecting rod 154 to rotate, and the second connecting rod 154 drives the transmission component 156 to rotate, thereby driving the moving contact 130 fixed with the transmission component 156 to rotate, through which the transmission from the handle 140 to the moving contact 130 is realized.

When the locking assembly 160 is in the locked state, the locking assembly 160 can block the movement of the transmission component 156 in the transmission assembly 150, thereby preventing the movement of the whole transmission assembly 150, and thus preventing the movement of the moving contact 130, and finally preventing the mechanical breakpoint module 100 from being switched from the closed state to the open state. When the locking assembly 160 is in the unlocked state, the degree of freedom of the transmission component 156 in the transmission assembly 150 is released (that is, the transmission component 156 can move), so that the whole transmission assembly 150 can move, and thus the moving contact 130 driven by the transmission assembly 150 can move away from the fixed contact 120, and finally the mechanical breakpoint module 100 can be switched from the closed state to the open state. That is, regardless of whether the handle 140 is in the closed position or the open position, the state of the mechanical breakpoint module 100 (closed state or open state) can be correspondingly controlled by controlling the state of the locking assembly 160 (locked state or unlocked state). In this way, even when the handle 140 is in the closed position, when the circuit fails such as an overload occurs, the mechanical breakpoint module 100 can be switched open by unlocking the locking assembly 160, thus timely protecting the circuit from further damage.

Optionally, the transmission component 156 may include a main body and a first protruding part 156-1, a second protruding part 156-2 and a third protruding part 156-3 protruding outward from the main body. The mounting point between the transmission component 156 and the housing 110 is located on the first protruding part 156-1, the second protruding part 156-2 is fixedly connected with the moving contact 130, and the third protruding part 156-3 abuts the locking assembly 160. In this way, the first protruding part 156-1 of the transmission component 156 is used to be rotatably fixed to the housing 110, the second protruding part 156-2 of the transmission component 156 is used to convert the movement of the transmission component 156 into the movement of the moving contact 130, and the third protruding part 156-3 of the transmission component 156 is used to be associated with the locking assembly 160. Preferably, the transmission component 156 can be a bird's head.

Preferably, the locking assembly 160 may include a opening lever 162 with a protrusion 164 (e.g., a hook) and a lock catch 166 with a lock hole. When the locking assembly 160 is in a locked state, the protrusion 164 is inserted into the lock hole, so that the opening lever 162 is fixed relative to the lock catch 166, so that the lock catch 166 can block the movement of the transmission component 156, thereby preventing the mechanical breakpoint module 100 from being switched from the closed state to the open state.

Optionally, the energy storage component 170 may be a spring, and when the mechanical breakpoint module 100 is in the closed state, the spring 170 is in the energy storage state. In this way, when the locking assembly 160 is unlocked, the spring 170 can release its stored elastic potential energy to drive the transmission assembly 160 to move, thereby driving the moving contact 130 to move in the direction away from the fixed contact 120. Therefore, when the locking assembly 160 is unlocked, the mechanical breakpoint module 100 can be automatically switched open under the action of the spring 170 without manual operation, further increasing the reliability and safety of the circuit.

Optionally, the handle 140 may include a driving arm 142. When the locking assembly 160 is in the locked state, and when the handle 140 is rotated to the open position (rotating clockwise as shown in FIGS. 2 and 3, it should be understood that the clockwise direction is only an example, and the handle 140 can be rotated in other directions according to the specific situation), the driving arm 142 can contact the opening lever 162 and drive the opening lever 162 to rotate, so that the lock assembly 160 can move to the unlocked state. In this way, when the locking assembly 160 is in the locked state, the mechanical breakpoint module 100 can be switched open only by operating the handle 140. Specifically, firstly, the locking assembly 160 is unlocked by the driving arm 142 on the handle 140, and then the transmission assembly 150 is driven by the elastic force of the spring 170, so as to drive the moving contact 130 to move to realize the separation of the moving contact 130 from the fixed contact 120, thereby switching open the mechanical breakpoint module 100.

Optionally, the mechanical breakpoint module 100 may further include a button (not shown), one end of which protrudes out of the housing 110, and the other end of which is close to the opening lever 162. When the locking assembly 160 is in a locked state, and when the bottom is pressed, the button can contact the opening lever 162 and drive the opening lever 162 to rotate, so that the locking assembly 160 can move to an unlocked state. In this way, when the locking assembly 160 is in the locked state, the mechanical breakpoint module 100 can be switched open by pressing the button. Specifically, firstly, the locking assembly 160 is unlocked by pressing the button, and then the transmission assembly 150 is driven by the elastic force of the spring 170, so as to drive the moving contact 130 to move to realize the separation of the moving contact 130 from the fixed contact 120, thereby switching open the mechanical breakpoint module 100.

The above describes three methods of switching open the mechanical breakpoint module 100 in case of unexpected events such as a circuit overload. These three methods all include two steps, that is, first unlocking the locking assembly 160, and then driving the moving contact 130 to be separated from the fixed contact 120 through the transmission assembly 150 to switch open the mechanical breakpoint module 100. The above three methods are basically the same in the respective second steps, and the main difference is in the respective first steps regarding how to unlock the locking assembly 160, in which the driving arm 142 and the button unlock the locking assembly 160 mechanically and the controller 180 unlocks the locking assembly 160 electronically. Preferably, the mechanical breakpoint module 100 can, at the same time, include the driving arm 142, the button and the controller 180 which are independent of each other. In this way, as long as one of the driving arm 142, the button and the controller can work normally, the locking assembly 160 can be unlocked and the mechanical breakpoint module 100 can be switched open, so that a larger safety margin can be obtained.

A number of exemplary implementations of the present invention have been described in detail herein with reference to preferred embodiments. However, those skilled in the art can understand that various variations and modifications can be made to the above specific embodiments without departing from the inventive concept, and various technical features and structures proposed by the present invention can be combined without exceeding the scope of protection of the present invention, which is determined by the appended claims.

What is claimed is:

1. A mechanical breakpoint module for a solid-state circuit breaker, comprising: a housing;

a handle mounted to the housing and rotatable between an open position and a closed position;

a fixed contact fixed to the housing;

a moving contact capable of rotating so as to contact or separate from the fixed contact so as to put the mechanical breakpoint module in a closed state and an open state respectively;

a transmission assembly, through which the movement of the handle is transmitted to the moving contact;

an energy storage component connected to the transmission assembly and configured to drive the transmission assembly to move;

a locking assembly capable of being switched between a locked state and an unlocked state, wherein when the locking assembly is in the locked state, the mechanical breakpoint module cannot be switched from the closed state to the open state, and when the locking assembly is in the unlocked state, the mechanical breakpoint module can be switched from the closed state to the open state;

wherein in response to receiving an unlocking signal sent by a controller, the locking assembly switches from the locked state to the unlocked state, so that the transmission assembly is driven by the energy storage component, thereby driving the moving contact to be separated from the fixed contact.

2. The mechanical breakpoint module according to claim 1, wherein, the transmission assembly comprises a first connecting rod, a second connecting rod and a transmission component, and the handle is connected to a first end of the first connecting rod via the energy storage component;

the first end of the first connecting rod is rotatably connected with a first end of the second connecting rod, and a second end of the first connecting rod opposite to the first end is rotatably mounted to the housing;

a second end of the second connecting rod opposite to the first end is rotatably connected with the transmission component;

the transmission component is rotatably mounted to the housing, and a connection point between the transmission component and the second connecting rod is spaced apart from a mounting point between the transmission component and the housing;

the transmission component is fixedly connected with the moving contact, and when the locking assembly is in the locked state, the locking assembly can block the movement of the transmission component, thereby preventing the mechanical breakpoint module from being switched from the closed state to the open state.

3. The mechanical breakpoint module according to claim 2, wherein, the transmission component comprises a main body, and a first protruding part, a second protruding part and a third protruding part protruding outward from the main body, the mounting point between the transmission component and the housing is located on the first protruding part, the second protruding part is fixedly connected with the moving contact, and the third protruding part abuts the locking assembly.

4. The mechanical breakpoint module according to claim 2, wherein, the locking assembly comprises an opening lever with a protrusion and a lock catch with a lock hole, and when the locking assembly is in the locked state, the protrusion is inserted into the lock hole, so that the opening lever is fixed relative to the lock catch, so that the lock catch can block the movement of the transmission component, thereby preventing the mechanical breakpoint module from being switched from the closed state to the open state.

5. The mechanical breakpoint module according to claim 1, wherein, the energy storage component is a spring.

6. A solid-state circuit breaker, comprising the mechanical breakpoint module according to claim 1.

7. The solid-state circuit breaker according to claim 6, further comprising an electronic breakpoint module, wherein the electronic breakpoint module is connected in series with the mechanical breakpoint module.

* * * * *